United States Patent
Nakamura et al.

(10) Patent No.: US 6,916,358 B2
(45) Date of Patent: Jul. 12, 2005

(54) ADSORBENT FOR SEPARATING NITROGEN FROM MIXED GAS OF OXYGEN AND NITROGEN

(75) Inventors: Akihiro Nakamura, Kofu (JP); Masato Kawai, Yokohama (JP); Masayoshi Hayashida, Kitakoma-gun (JP); Yoshinori Watanabe, Iwaki (JP); Shinichi Marumo, Kitakoma-gun (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 10/487,595

(22) PCT Filed: Aug. 29, 2002

(86) PCT No.: PCT/JP02/08729

§ 371 (c)(1),
(2), (4) Date: Feb. 24, 2004

(87) PCT Pub. No.: WO03/018189

PCT Pub. Date: Mar. 6, 2003

(65) Prior Publication Data

US 2004/0231510 A1 Nov. 25, 2004

(30) Foreign Application Priority Data

Aug. 29, 2001 (JP) ........................................ 2001-260345

(51) Int. Cl.$^7$ ............................................ B01D 53/047
(52) U.S. Cl. ................................ 95/96; 95/138; 95/903; 96/108; 502/416
(58) Field of Search ........................... 95/96–106, 138, 95/903; 96/108; 502/416, 418, 420

(56) References Cited

U.S. PATENT DOCUMENTS

| | | | |
|---|---|---|---|
| 3,962,129 A | | 6/1976 | Munzner et al. |
| 4,526,887 A | * | 7/1985 | Sutt, Jr. ..................... 502/420 |
| 4,528,281 A | * | 7/1985 | Sutt, Jr. ..................... 502/402 |
| 4,540,678 A | * | 9/1985 | Sutt, Jr. ......................... 502/5 |
| 4,925,461 A | * | 5/1990 | Gemba et al. ................. 95/98 |
| 4,933,314 A | * | 6/1990 | Marumo et al. ............ 502/416 |
| 5,071,450 A | | 12/1991 | Cabrera et al. |
| 5,086,033 A | * | 2/1992 | Armor et al. ............... 502/432 |
| 5,098,880 A | * | 3/1992 | Gaffney et al. ............. 502/432 |
| 5,164,355 A | * | 11/1992 | Farris et al. ................ 502/420 |
| 5,238,888 A | | 8/1993 | Abe |
| 5,240,474 A | * | 8/1993 | Auvil et al. .................... 95/96 |
| 5,346,536 A | * | 9/1994 | Kaneshige et al. .......... 95/103 |
| 5,441,558 A | * | 8/1995 | Lee et al. ..................... 95/100 |
| 5,972,834 A | * | 10/1999 | Ohsaki et al. ............. 502/416 |
| 2003/0097931 A1 | * | 5/2003 | Kawai et al. .................. 95/96 |

FOREIGN PATENT DOCUMENTS

| | | |
|---|---|---|
| JP | 59-045914 | 3/1984 |
| JP | 03-238018 | 10/1991 |
| JP | 03-242649 | 10/1991 |
| JP | 05-269331 | 10/1993 |
| JP | 6-154595 | 6/1994 |
| JP | 7-187658 | 7/1995 |
| JP | 8-224428 | 9/1996 |
| JP | 10-192636 | 7/1998 |
| JP | 2000-117036 | 4/2000 |
| WO | WO 87/07249 | 12/1987 |
| WO | WO 96/33801 | 10/1996 |

OTHER PUBLICATIONS

Magazine "Kagaku Sochi (Chemical Apparatus)" 1983 (Showa 58), No. 8, p. 39.

* cited by examiner

*Primary Examiner*—Robert H. Spitzer
(74) *Attorney, Agent, or Firm*—Nixon & Vanderhye P.C.

(57) ABSTRACT

An adsorbent for separating nitrogen from a mixed gas of oxygen and nitrogen is MSC wherein an oxygen and nitrogen separation ratio α and a ratio ($t_{95}/t_{50}$) of a time $t_{50}$ required for adsorbing 50% of the oxygen equilibrium adsorption amount and a time $t_{95}$ required for adsorbing 95% of the oxygen equilibrium adsorption amount satisfy the inequality $$(t_{95}/t_{50}) < 0.4 \times (\alpha - 24) \quad \alpha \geq 35.$$

The amount of adsorbent used with respect to a predetermined amount of nitrogen generated can be reduced since a method is carried out which uses this adsorbent to produce nitrogen by separating nitrogen from the mixed gas of oxygen and nitrogen by means of a PSA method. By this method, it is possible to reduce the cost of the apparatus and reduce and miniaturize the scale of the apparatus, and the power consumption amount can be reduced.

6 Claims, 8 Drawing Sheets

ADSORBENT FOR SEPARATING NITROGEN FROM MIXED GAS OF OXYGEN AND NITROGEN

This application is the US national phase of international application PCT/JP02/08729 filed 29 Aug. 2002 which designated the U.S. and claims benefit of JP 2001-260345, dated 29 Aug. 2001, the entire content of which is hereby incorporated by reference.

TECHNICAL FIELD

The present invention relates to an adsorbent, in particular, molecular sieving carbon (referred to below as "MSC"), for separating and recovering nitrogen by a pressure swing adsorption method (referred to below as "PSA method") from a mixed gas of oxygen and nitrogen (for example, air as a raw gas) and to a nitrogen production method using this adsorbent. Specifically, the present invention relates to an MSC adsorbent having the separation performance necessary as an adsorbent for improving the capability of nitrogen production carried out by a PSA method, and to a nitrogen production method carried out by a PSA method using this MSC adsorbent which has a good separation performance.

The present specification is based on a patent application filed in Japan (Japanese Patent Application No. 2001-260345). The content disclosed in this Japanese application is incorporated as a part of the present specification.

BACKGROUND ART

In recent years, a method which has been widely used as a production method for nitrogen generates high purity nitrogen by a PSA method by making use of an adsorbent which preferentially adsorbs oxygen from a mixed gas of oxygen and nitrogen, e.g., air ("air" will be used below to illustrate a mixed gas of oxygen and nitrogen).

This is a technique of separating nitrogen from air by means of adsorption based on a PSA method. This technique comprises: a pressurization adsorption step of pressurizing air to a suitable pressure and bringing the air into contact with an adsorbent layer, selectively adsorbing the pressurized oxygen portion, and maintaining this for a certain period, an adsorption step of terminating the supply of air to this adsorbent layer after the adsorbent has been saturated with oxygen; and a depressurization regeneration step, after completion of the adsorption step, of decreasing the pressure to the atmospheric pressure by depressurizing the adsorbent layer, desorbing the oxygen portion which has been adsorbed in the adsorbent by this means, and regenerating the adsorbent.

MSC is activated carbon which literally has a molecular sieving action, and is characterized in that, in comparison with normal activated carbon, the average pore size is smaller and the pore distribution is sharp. Since the pore size and molecular diameter of the adsorbate are very similar, MSC experiences a phenomenon in which the adsorption rate is decreased for specific combinations of the adsorbent and the adsorbate.

For example, when attempting to obtain nitrogen-enriched gas from a mixed gas of oxygen and nitrogen such as air, it is preferred that the MSC be one for which the adsorption rate of nitrogen with respect to the adsorption rate of oxygen is very slow due to the difference in the molecular diameters of oxygen and nitrogen.

Such a PSA method which carries out adsorption and desorption by changing the pressure has the characteristic that it is possible to make the air processing amount per unit adsorbent large since it is possible to change the pressure in a relatively short cycle of about one minute. Therefore, in comparison with a conventional nitrogen separation method carried out by a cryogenic air separator and adopted as a nitrogen production method, since the apparatus structure is greatly simplified and there are also advantages in terms of the decrease in cost for setting up the apparatus, it has come to be very widely used in small and medium scale businesses which use nitrogen.

Furthermore, the production process in the nitrogen production technique carried out by a PSA method which uses an MSC adsorbent is primarily constituted by a pressure increasing step, adsorption step, pressure-equalization depressurization step, depressurization step, regeneration step, and pressure-equalization pressurization step.

In contrast, regarding the operating characteristics of the apparatus, as disclosed in the magazine "Kagaku Sochi (Chemical Apparatus)" 1983 (Showa 58), No. 8, page 39, etc., a large number of studies have come about from the prior art. Recently, as a result of improvements and advances in processes, progress can be seen in technologies in which production of nitrogen having a high purity of 99.999% is possible; yet, on the other hand, the provision of cheaper nitrogen or a decrease in production costs has been strongly desired.

The separation processing efficiency in the PSA method is largely dependent on the adsorption performance of MSC, which is the separation adsorbent, and on the process of the PSA method, and there is a necessity for improvements in the adsorption characteristics of the MSC adsorbent in the large reduction of production costs and further improvements of the process of the PSA method.

Regarding advances in the process of the nitrogen production method by a PSA method, the publication of Japanese Unexamined Patent Application, First Publication No. Hei 8-224428, for example, discloses that by carrying out a countercurrent emission operation in a direction facing the introduction direction of air during the adsorption step either prior to the pressure-equalization step which occurs after completion of the adsorption step or at the same time as the pressure-equalization step, it is possible to improve the purity of the nitrogen product which is collected in the adsorption step. However, this is little more than an improvement of the yield and productivity which are taken as the performance of the PSA method.

Furthermore, the publication of Japanese Unexamined Patent Application, First Publication No. Hei 10-192636 discloses that by removing gas remaining in a column upon completion of an adsorption step from an intermediate position of an adsorption column in which an adsorbent is filled after the completion of the adsorption step and recovering gas by introducing it into another adsorption column from an air introduction end after completion of a regeneration step, it is possible to improve both the nitrogen productivity and yield. However, this is nothing more than the effect in a restricted area of an ultrapure region in which the concentration of oxygen, which is an impurity in the collected nitrogen product, is several ppm.

In contrast, regarding the adsorption characteristics of MSC, the publication of Japanese Unexamined Patent Application, First Publication No. Sho 59-45914, for example, discloses that it is necessary to have an oxygen adsorption amount of 5 ml/g or more and an oxygen/nitrogen selectivity in an amount of 20 to 23 or more in order to efficiently separate oxygen and nitrogen by a PSA method. However, this is not sufficient in terms of satisfying the currently desired reduction in production costs.

Furthermore, the publication of Japanese Unexamined Patent Application, First Publication No. Hei 3-242649 discloses MSC as a starting material in which the majority of pores have a pore size of about 4.5 to 8 angstroms and discloses that it is possible to obtain an MSC adsorbent having improved adsorption characteristics and higher selectivity by thermal decomposition of hydrocarbons in the carbon material using a two-stage processing method. However, regarding the MSC adsorbent obtained here, there is nothing more than the disclosure of simply confining the majority of pore sizes to about 4.0 angstroms.

Moreover, the invention of Japanese Patent No. 2623487 has a structure in which a plurality of spherical particles having a particle size of 0.8 to 120 μm are randomly and three-dimensionally layered and united. By using MSC (molecular sieving carbon) of which the capacity ratio of the adsorption amount of oxygen and nitrogen after one minute is 3.5 to 20 when single component adsorption is carried out at a pressure of 2.5 kgf/cm$^2$, it is possible to generate a large quantity of high purity nitrogen at a low energy consumption rate. Although there is a disclosure regarding the preferable adsorption characteristics of MSC, this relates to a specific MSC in which the primary particles are spherical and which have the characteristic of being spheres in which the oxygen equilibrium adsorption amount is large in comparison with a normally used natural raw material such as coconut shell char.

Furthermore, the publication of Japanese Unexamined Patent Application, First Publication No. Hei 5-269331 discloses that improving the oxygen adsorption amount per adsorbent unit capacity is more effective than the oxygen/nitrogen selectivity of MSC with regard to the performance of the PSA method. By using MSC having a capacity of 9 cc/cc or more as the oxygen adsorption amount per unit capacity, even if the selectivity is 15% lower than that conventionally, it is possible to obtain the same performance. However, there is a problem in that, in exchange for improving the oxygen adsorption amount, the selectivity decreases, and therefore, regardless of the increase of the oxygen adsorption amount, the failure to achieve an improvement of the performance of the PSA method becomes a reality.

DISCLOSURE OF THE INVENTION

The present invention was made in view of the above circumstances and the object thereof is to provide a MSC adsorbent and a nitrogen production method carried out by a PSA method, with which it is possible to produce nitrogen at a minimal operating cost and construct a more compact nitrogen production apparatus by combining a MSC adsorbent having optimal adsorption rate characteristics and a PSA process in the nitrogen production method carried out by the PSA method.

In order to solve the above-mentioned problem, the present invention provides the following constitutions:

an adsorbent for separating nitrogen from a mixed gas of oxygen and nitrogen, the adsorbent being a MSC wherein the oxygen and nitrogen separation ratio α (the ratio of the oxygen adsorption rate constant $K(O_2)$ to the nitrogen adsorption rate constant $K(N_2)$, $K(O_2)/K(N_2)$) is 35 or more, and the adsorption rate characteristic, which is expressed by a time $t_{95}$ required for adsorbing 95% of the oxygen equilibrium adsorption amount and a time $t_{50}$ required for adsorbing 50% of the oxygen equilibrium adsorption amount, satisfies the following inequality:

$$(t_{95}/t_{50}) < 0.4 \times (\alpha - 24) \alpha \geq 35;$$

an adsorbent for separating nitrogen from a mixed gas of oxygen and nitrogen, the adsorbent being a MSC, wherein the oxygen adsorption rate constant is $6.5 \times 10^{-2}$ s$^{-1}$ or more, the oxygen and nitrogen separation ratio α (the ratio of the oxygen adsorption rate constant $K(O_2)$ to the nitrogen adsorption rate constant $K(N_2)$, $K(O_2)/K(N_2)$) is 35 or more, and the adsorption rate characteristic, which is expressed by a time $t_{95}$ required for adsorbing 95% of the oxygen equilibrium adsorption amount and a time $t_{50}$ required for adsorbing 50% of the oxygen equilibrium adsorption amount, satisfies the following inequality:

$$(t_{95}/t_{50}) < 0.4 \times (\alpha - 24) \alpha \geq 35;$$

the adsorbent for separating nitrogen from a mixed gas of oxygen and nitrogen, wherein the MSC is prepared by a pore adjustment process by means of chemical vapor deposition (CVD) of a thermally decomposable hydrocarbon at 600 to 770° C.;

the adsorbent for separating nitrogen, wherein the mixed gas of oxygen and nitrogen is air; and a nitrogen production method carried out by a PSA method in which one cycle comprises a pressurization adsorption step of collecting nitrogen by pressurizing a mixed gas of oxygen and nitrogen and bringing the gas into contact with the above-mentioned adsorbent, and a depressurization desorption step of depressurizing the adsorbent which is in a pressurized state after the adsorption step and desorbing adsorbed components wherein the half cycle time is 45 to 240 seconds, and preferably 60 to 180 seconds.

BEST MODE FOR CARRYING OUT THE INVENTION

Figure 1:
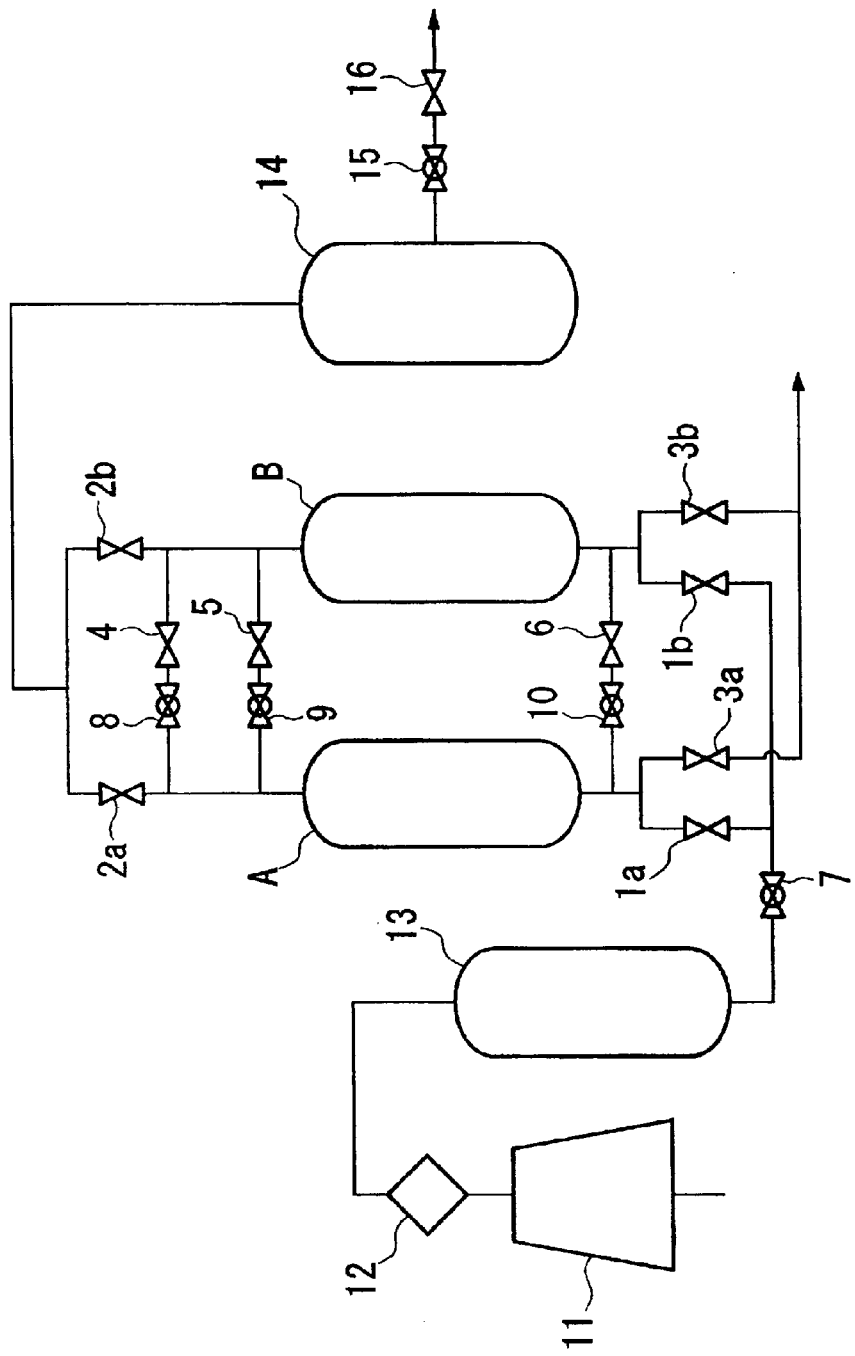
FIG. 1 is a system diagram showing an example of a PSA type nitrogen production apparatus used in the nitrogen production method of the present invention.

FIG. 1 is a system diagram showing an example of a nitrogen PSA apparatus using the nitrogen production method of the present invention. This nitrogen PSA apparatus is constituted by: two adsorption columns A and B filled with a MSC as a adsorbent; an air compressor 11 for pressurizing air; an air drier 12 for removing moisture in the air; an air storage tank 13; a nitrogen product storage tank 14; inlet valves 1a and 1b, outlet valves 2a and 2b, exhaust valves 3a and 3b, a purge valve 4, and pressure equalization valves 5 and 6, all of which open and close in order to switch the processes of the adsorption column A an adsorption column B; flow rate control valves 7, 8, 9, 10, and 15 for controlling the gas flow rate to a predetermined flow rate; and a nitrogen product retrieval valve 16.

Figure 2:
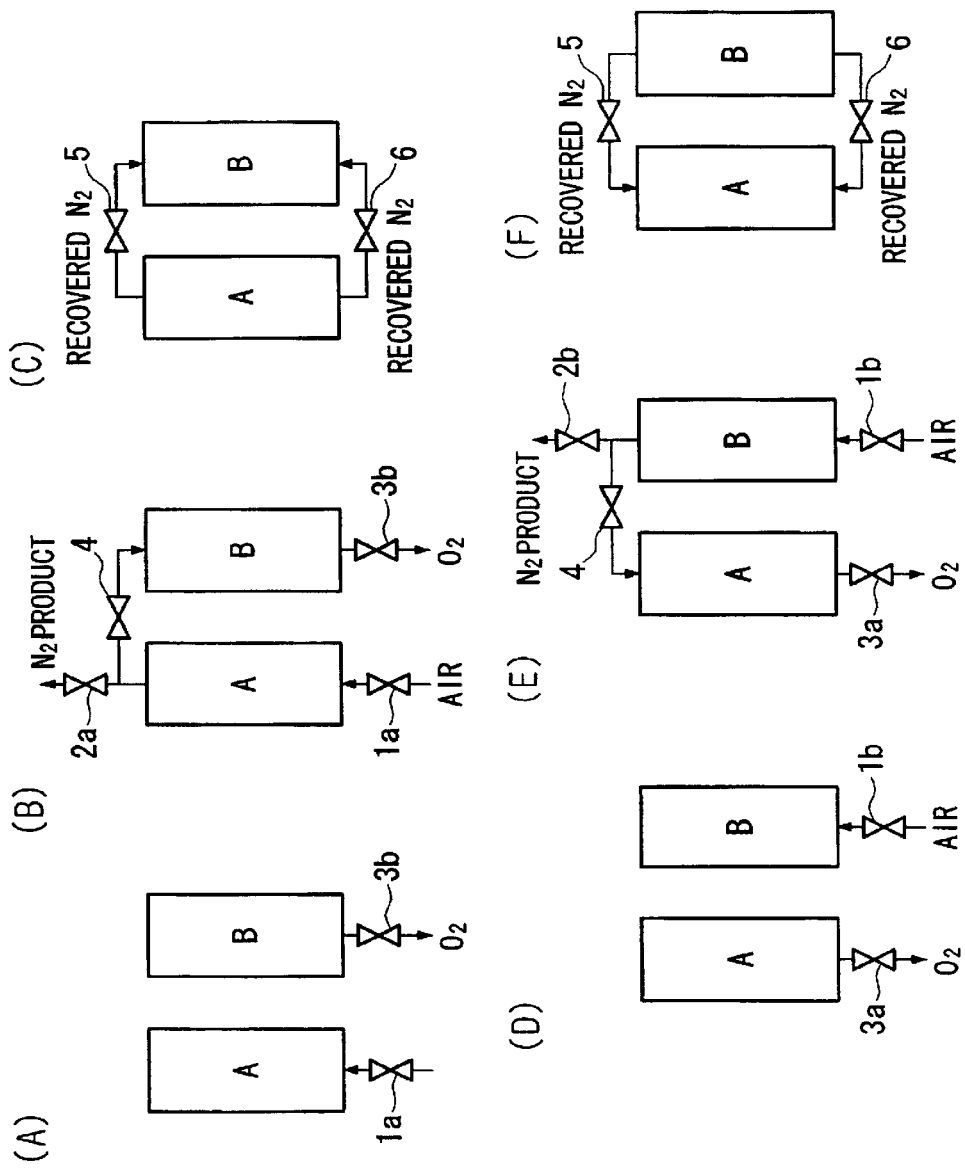
FIG. 2 is a process explanation diagram of the nitrogen production method of the present invention.

This nitrogen PSA apparatus operates by sequentially and periodically switching between six steps: a pressurization step, an adsorption step, a depressurization pressure-equalization step, a depressurization step to atmospheric pressure, a regeneration step, and a pressurization pressure-equalization step. This will be explained with reference to the process explanation diagram of FIG. 2. FIG. 2 shows only the valves of FIG. 1 which are in an open state and the relevant column path.

Below, an explanation will be made of each step focusing on the adsorption column A in FIG. 2. Each of adsorption column A and adsorption column B is filled with MSC as an adsorbent. FIG. 2(A) shows the pressurization step being carried out. Air is pressurized to a predetermined pressure, e.g., 0.65 MPa (gage pressure, same below), by the air compressor 11, moisture is removed by the air drier 12, and the air is supplied to the air storage tank 13. The pressurized air which is stored in the air storage tank 13 is supplied to the adsorption column A via the flow rate control valve 7 and valve 1 a and adjusted so that the pressure increase rate is 0.26 to 1.9 MPa/min.

This pressure increase rate is calculated by dividing the pressure difference by the time required for increasing the pressure from the pressure after the pressurization pressure-equalization step to the pressure at the time of completion of the pressurization step.

Each of the outlet valve 2a, exhaust valve 3a, purge valve 4, equalization valves 5 and 6, etc., are maintained in a closed state, and the adsorption column A is pressurized to a predetermined pressure by the air. Meanwhile, gas inside the other adsorption column B is released from the exhaust valve 3b. The nitrogen product retrieval valve 16 is normally open, and nitrogen inside the nitrogen product storage tank 14 is controlled by the flow rate control valve 15 and normally supplied downstream at a fixed flow rate.

When the pressure of the adsorption column A exceeds the pressure of the nitrogen product storage tank 14, the outlet valve 2a opens, and the process switches to the adsorption step shown in FIG. 2(B). Oxygen, which is an easily adsorbed component of the air introduced into the adsorption column A via the inlet valve la, is adsorbed in the MSC adsorbent, and nitrogen, which is a component that is not easily adsorbed, is introduced via the outlet valve 2a and stored in the nitrogen product storage tank 14. Meanwhile, the purge valve 4 is opened for a suitable period of time during this adsorption step, a portion of the nitrogen is controlled to a predetermined flow rate by the flow rate control valve 8 and introduced into the adsorption column B, and a purge operation of the adsorption column B is performed. This adsorption step saturates the MSC adsorbent in the adsorption column A with oxygen, and is carried out until just before the purity of the nitrogen product begins to decrease.

When the adsorption step is completed, the inlet valve 1a and the outlet valve 2a of the adsorption column A are closed, equalization valves 5 and 6 are opened, and the process is switched to the pressure-equalization step shown in FIG. 2(C). In this pressure-equalization step, gas inside the adsorption column A is controlled to a predetermined flow rate by the flow rate control valves 9 and 10 and introduced into the adsorption column B. By this means, nitrogen-rich gas inside the adsorption column A in which the adsorption step has been completed is recovered in the adsorption column B in which the regeneration step has been completed. At this time, the adsorption column A enters the depressurization pressure-equalization step, and the adsorption column B enters the pressurization pressure-equalization step.

When the pressure-equalization step is completed, equalization valves 5 and 6 close, exhaust valve 3a opens, and the process is switched to the depressurization step shown in FIG. 2(D). In this depressurization step, gas inside the adsorption column A is released to the atmosphere from the exhaust valve 3a, and the inside of the adsorption column A is depressurized to atmospheric pressure. Meanwhile, the inlet valve 1b is opened and a pressurization step is carried out in the adsorption column B.

Next, after the outlet valve 2b is opened and the adsorption column B is switched to the adsorption step, the purge valve 4 is opened, and the process is switched to the regeneration step shown in FIG. 2(E). In this regeneration step, the outlet side of the adsorption column A is connected to the adsorption column B via the flow rate control valve 8 and purge valve 4, a portion of the nitrogen product is introduced into the adsorption column A from the adsorption column B, and a component adsorbed in the adsorption step is desorbed from the adsorbent using nitrogen and exhausted from the adsorption column A, thereby regenerating the MSC adsorbent. At this time, depressurizing and evacuating the inside of the adsorption column A in accordance with need is rendered more effective by means of a vacuum pump.

When the regeneration step is completed, the exhaust valve 3a and purge valve 4 are closed, the pressure equalization valves 5 and 6 are opened, and the adsorption column A is switched to the pressurization pressure-equalization step as shown in FIG. 2(F). Nitrogen-rich gas is recovered in the adsorption column A from the inside of the adsorption column B which is undergoing a depressurization pressure-equalization step after the adsorption step. When this pressurization pressure-equalization step has been completed, the adsorption column A returns to the first pressurization step shown in FIG. 2(A) and thereafter is sequentially switched to each of the above-described steps. This cycle of steps is repeatedly carried out.

With the operation of each step carried out as described above, the synchronized operation running time of each of the pressurization step, adsorption step, and depressurization pressure-equalization step is equal to the synchronized operation running time of each of the subsequent depressurization step, regeneration step, and pressurization pressure-equalization step, and this is taken as the half cycle time of an operation cycle of the PSA type nitrogen production method. This half cycle time is 90 to 135 seconds.

In order to obtain an MSC adsorbent having favorable adsorption characteristics in the PSA type nitrogen production method carried out by the above-mentioned process of steps of the present invention, the following MSC adsorbents were prepared, and the performances thereof were examined.

<MSC Preparation>

The preparation of MSC adsorbents was carried out under the following conditions.

Starting material: coconut shell char

Production of base material: After pulverizing, granulating, and carbonizing the starting material coconut shell char, a base material was formed by carrying out an activation process.

Adjustment of pores: Using a thermally decomposable hydrocarbon such as toluene, benzene, and the like, the hydrocarbon was thermally decomposed (chemical vapor deposition (CVD)) and a pore adjustment process was carried out on the above-mentioned base material. Due to a thermal decomposition temperature difference of the thermally decomposable hydrocarbon which was used, six different kinds of MSC adsorbents were produced by the pore adjustment process.

(1) Using toluene as the thermally decomposable hydrocarbon, a pore adjustment process was carried out at a thermal decomposition temperature of 600° C., and adsorbent "MSC-5" (specimen number, same below) was obtained.

(2) Using toluene as the thermally decomposable hydrocarbon, a pore adjustment process was carried out at a thermal decomposition temperature of 620° C., and adsorbent "MSC-6" was obtained.

(3) Using benzene as the thermally decomposable hydrocarbon, a pore adjustment process was carried out at a thermal decomposition temperature of 730° C., and adsorbent "MSC-7" was obtained.

(4) Using benzene as the thermally decomposable hydrocarbon, a pore adjustment process was carried out at a thermal decomposition temperature of 750° C., and adsorbent "MSC-8" was obtained.

(5) Using benzene as the thermally decomposable hydrocarbon, a pore adjustment process was carried out at a thermal decomposition temperature of 770° C., and adsorbent "MSC-9" was obtained.

(6) Using benzene as the thermally decomposable hydrocarbon, a pore adjustment process was carried out at a thermal decomposition temperature of 730° C., and adsorbent "MSC-10" was obtained.

<Measurement of Each Adsorption Performance>

The adsorption performance of the six kinds of MSC adsorbents, MSC-5, 6, 7, 8, 9, and 10 prepared as described above, were measured together with the adsorption performance of currently available MSC adsorbents, MSC-1, 2, 3, and 4.

The measured adsorption performances are as follows.

Oxygen equilibrium adsorption amount (ml/g)

Oxygen and nitrogen separation ratio $\alpha$=oxygen adsorption rate constant $K(O_2)$/nitrogen adsorption rate constant $K(N_2)$ Ratio $t_{95}/t_{50}$ of time $t_{50}$ required for adsorbing 50% of the oxygen equilibrium adsorption amount and time $t_{95}$ required for adsorbing 95% of the oxygen equilibrium adsorption amount Nitrogen yield (%) at the product nitrogen purity of 99.9%

Nitrogen productivity ($Nm^3$/h/ton) at the product nitrogen purity of 99.9%

The measurement of these adsorption performances was carried out for three half cycle times of the above-mentioned operation steps of 90 seconds, 105 seconds, and 135 seconds, and the performance with the highest value is shown in Table 1.

TABLE 1

| Specimen | $O_2$ equilibrium adsorption amount (ml/g) | $K(O_2)$ ($s^{-1}$) | $K(N_2)$ ($s^{-1}$) | $\alpha$ (—) | $t_{95}/t_{50}$ (—) | 99.9% $N_2$ yield (%) | $N_2$ productivity ($Nm^3$/h/t) | Half cycle time (s) |
|---|---|---|---|---|---|---|---|---|
| MSC-1 | 7.9 | $7.29 \times 10^{-2}$ | $1.87 \times 10^{-3}$ | 39.0 | 8.8 | 41.5 | 174 | 105 |
| MSC-2 | 7.9 | $7.70 \times 10^{-2}$ | $1.99 \times 10^{-3}$ | 38.7 | 8.7 | 42.3 | 169 | 105 |
| MSC-3 | 8.0 | $5.68 \times 10^{-2}$ | $1.32 \times 10^{-3}$ | 43.0 | 8.6 | 43.2 | 163 | 135 |
| MSC-4 | 7.9 | $5.26 \times 10^{-2}$ | $1.30 \times 10^{-3}$ | 40.5 | 8.6 | 41.0 | 146 | 135 |
| MSC-5 | 7.8 | $7.00 \times 10^{-2}$ | $1.65 \times 10^{-3}$ | 42.5 | 5.8 | 46.6 | 203 | 105 |
| MSC-6 | 7.9 | $7.27 \times 10^{-2}$ | $1.88 \times 10^{-3}$ | 38.7 | 5.0 | 45.5 | 213 | 90 |
| MSC-7 | 8.0 | $7.11 \times 10^{-2}$ | $1.65 \times 10^{-3}$ | 43.0 | 6.9 | 46.5 | 196 | 105 |
| MSC-8 | 8.0 | $6.64 \times 10^{-2}$ | $1.52 \times 10^{-3}$ | 43.7 | 7.2 | 44.5 | 205 | 90 |
| MSC-9 | 8.2 | $6.98 \times 10^{-2}$ | $1.90 \times 10^{-3}$ | 36.8 | 6.4 | 41.6 | 194 | 90 |
| MSC-10 | 8.0 | $8.50 \times 10^{-2}$ | $1.93 \times 10^{-3}$ | 44.4 | 6.2 | 46.7 | 211 | 105 |

Among the measured adsorption performances described above, measurements of the oxygen adsorption rate constant $K(O_2)$ and nitrogen adsorption rate constant $K(N_2)$ of the oxygen and nitrogen separation ratio $\alpha$=oxygen adsorption rate constant $K(O_2)$/nitrogen adsorption rate constant $K(N_2)$ were carried out as follows.

Using a currently available constant volume type measurement apparatus (product name "BELSORP 28" manufactured by Bel Japan, Inc.), the change of pressure over time due to adsorption in a constant volume vessel was measured.

The pre-treatment for each specimen included accurately weighing about 1 of the specimen, storing the specimen in a specimen tube under vacuum conditions for 30 minutes and raising the temperature to 100° C., and then holding for 2 hours.

The measurement was carried out at a temperature of about 25° C. and an introduction pressure of about 200 Torr (26.7 kPa). The adsorption equilibrium pressure of the specimens was 94 to 98 Torr (12.5 to 13.1 kPa), and each was no more than about 100 Torr (13.3 kPa).

Figure 3:
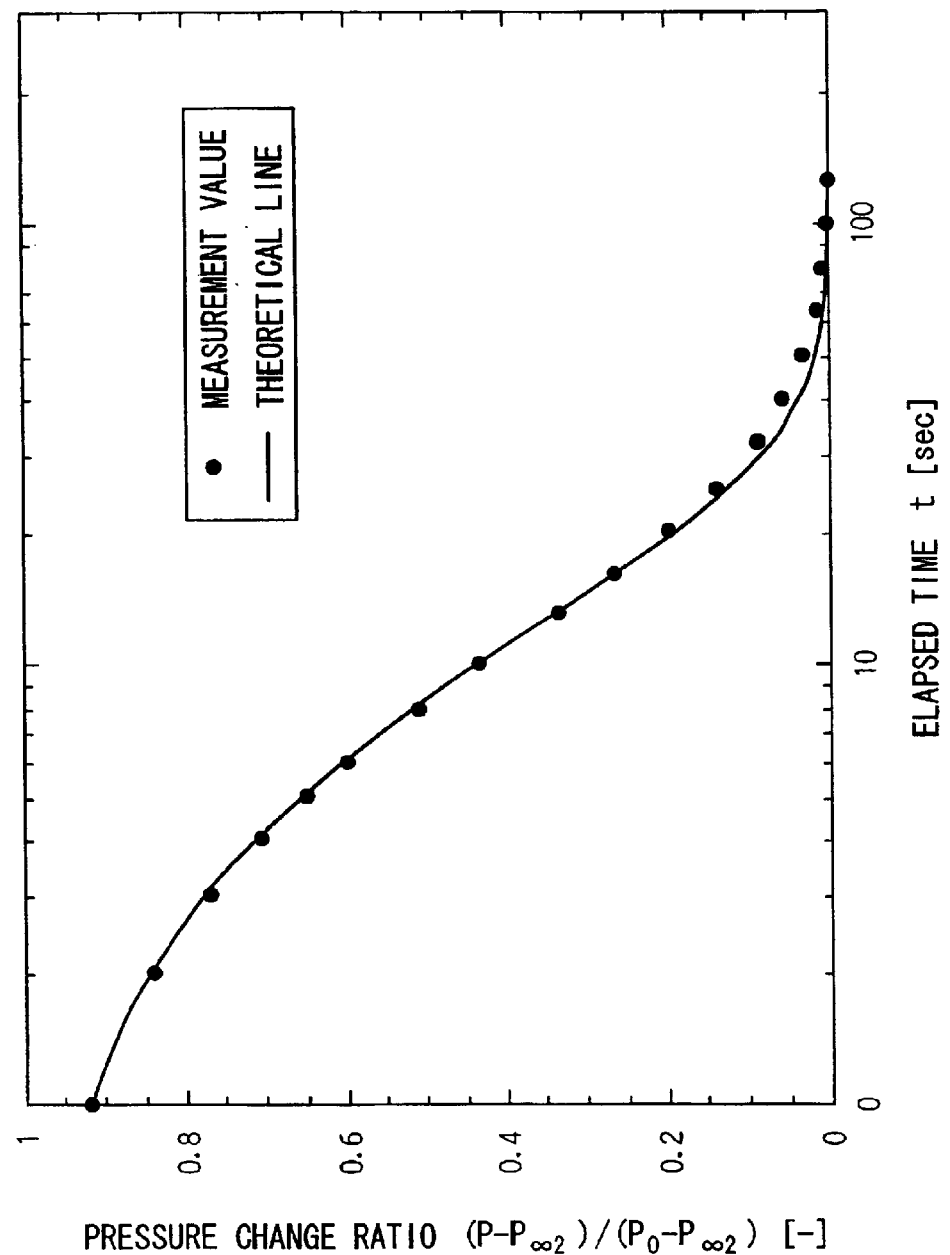
FIG. 3 is a diagram showing a pressure change curve over time during adsorption by a MSC adsorbent.

As shown in FIG. 3, using the pressure change data obtained by measurement as a basis, the pressure change curve over time was plotted, and a theoretical pressure change curve obtained from a LDF adsorption rate model (abbreviation for Linear Driving Force Model, refer to "Adsorption Engineering", page 253, published by Kodansha Ltd.) was matched with an adsorption amount of 50% of the equilibrium adsorption amount so as to determine the value of the adsorption rate constant K.

Here, the theoretical formula showing the pressure change which is based on the LDF adsorption rate model (Linear Driving Force Model) is expressed by formula (1) below.

$$\frac{P - P_{\infty 2}}{P_0 - P_{\infty 2}} = 1 - \left(\frac{P_0 - P_{\infty 1}}{P_0 - P_{\infty 2}}\right)\left(\frac{1}{\alpha + 1}\right)\left(1 - \exp\left(-K\left(\frac{\alpha + 1}{\alpha}\right)t\right)\right) \quad (1)$$

where $$\alpha = \frac{V}{WH} \qquad H = \frac{q_{\infty 2} - q_{\infty 1}}{P_{\infty 2} - P_{\infty 1}}$$

Figure 4:
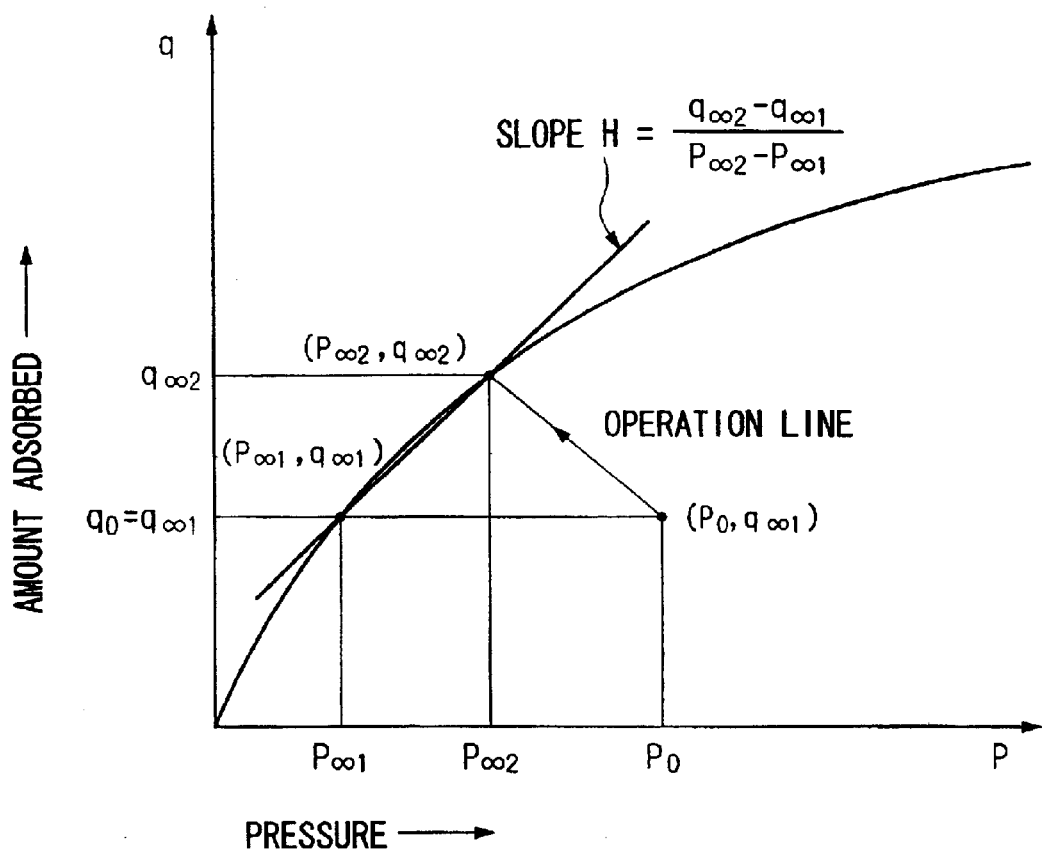
FIG. 4 is a diagram showing a graph of an equilibrium isotherm and a batch type adsorption operation line of the MSC adsorbent.

K: adsorption rate constant [$s^{-1}$], V: gas volume [ml], W: adsorbent amount [g], H: equilibrium constant This will be explained with reference to the graph of the equilibrium isotherm and batch type adsorption operation line of FIG. 4. The graph of FIG. 4 shows the pressure (P) on the horizontal axis and the adsorption amount (q) on the vertical axis. In FIG. 4, if the pressure from a certain steady state (pressure $P_{\infty 1}$, adsorption amount $q_{\infty 1}$) is taken to be the pressure P resulting t seconds after changing to $P_0$, the equilibrium pressure after adsorption is taken to be $P_{\infty 2}$, and the equilibrium adsorption amount at that time is taken to be $q_{\infty 2}$, and if Henry's Law is assumed to be established between the pressure and adsorption in the measured range, then the change in pressure due to adsorption is expressed by formula (1) shown above.

<Examination and Evaluation of Measurement Results>

Figure 5:
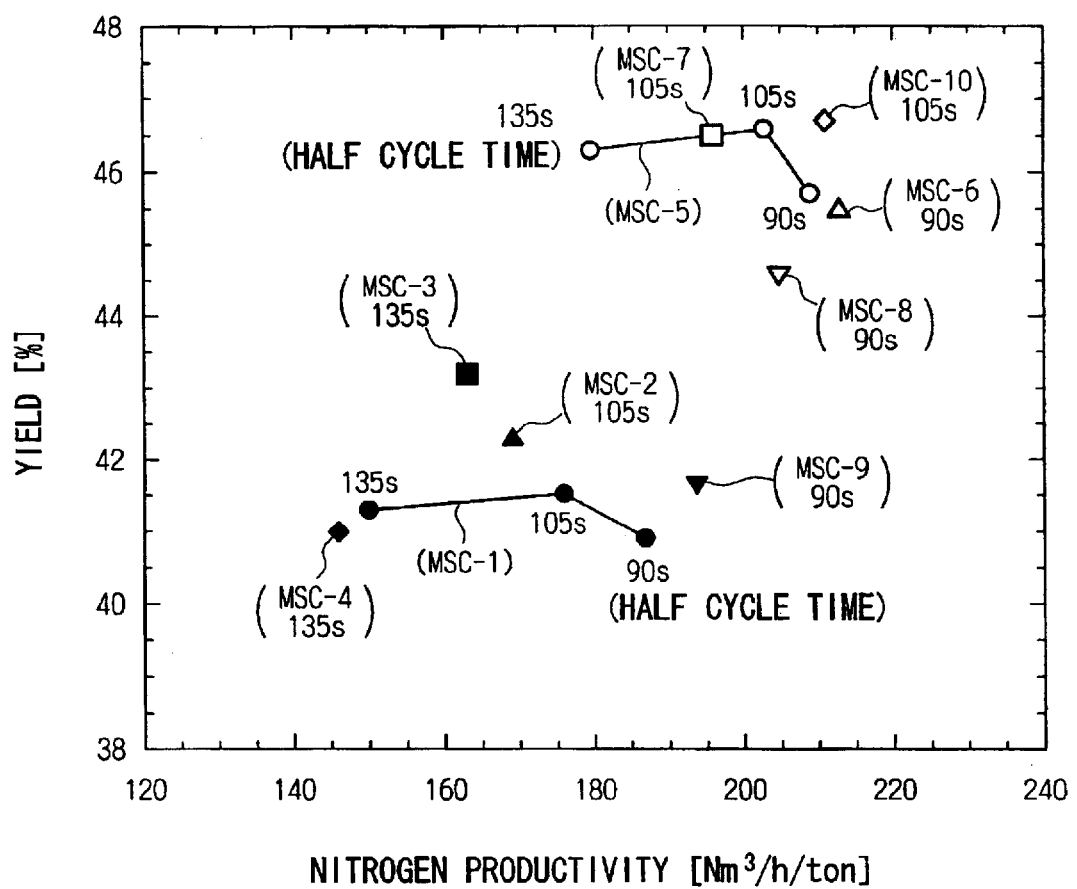
FIG. 5 is a PSA performance diagram showing the relationship of the nitrogen productivity (Nm$^3$/h/ton) and the nitrogen yield (%) at the product nitrogen purity of 99.9% for each MSC specimen.

Next, the relationship between the nitrogen productivity ($Nm^3$/h/ton) and the nitrogen yield (%) at the product nitrogen purity of 99.9% for each of the above-mentioned MSC specimens is shown in FIG. 5 as the PSA performance. The values shown for each specimen are shown as the resulting value of the half cycle time obtained for the best obtained results among each of the above-mentioned half cycle times (90 seconds, 105 seconds, and 135 seconds). For the MSC-1 and MSC-5 specimens, the performances for the three above-mentioned half cycle times are shown for reference.

In FIG. 5, the nitrogen productivity ($Nm^3$/h/ton) on the horizontal axis is the value of the nitrogen product amount per hour and is divided by the weight of MSC filled in one adsorption column.

As is clear from FIG. 5, the specimens which exhibit a good adsorption performance are the MSCs shown by open symbols. These are all MSC-5, 6, 7, 8, and 10 which were prepared by the present invention.

Therefore, upon examining the adsorption performances of MSC-5, 6, 7, 8, and 10 which exhibit good adsorption performances in FIG. 5 with reference to Table 1, any of the oxygen adsorption rate constants $K(O_2)$ were $6.0 \times 10^{-2}$ $s^{-1}$ or more. This can be considered as showing that an absorbent having a fast adsorption rate is capable of achieving a good PSA adsorption performance. However, in Table 1, if the adsorbents MSC-1 and MSC-2 of the prior art are compared with the MSC adsorbents prepared by the present invention, they all exhibit approximately the same performance in the points of oxygen equilibrium adsorption amount, oxygen adsorption rate constant $K(O_2)$, and separation ratio $\alpha$. However, a large difference is found in the PSA performances shown in FIG. 5, and it is clear that the performance of MSC-6 is remarkably superior. Based on this, assuming that a large influence is exerted on the PSA performance, it is expected that factors which exert a large influence on PSA performance are present in other than the oxygen equilibrium adsorption amount, oxygen adsorption rate constant (adsorption rate) $K(O_2)$, and separation ratio $\alpha$ which were conventionally considered to be very important factors.

Figure 6:
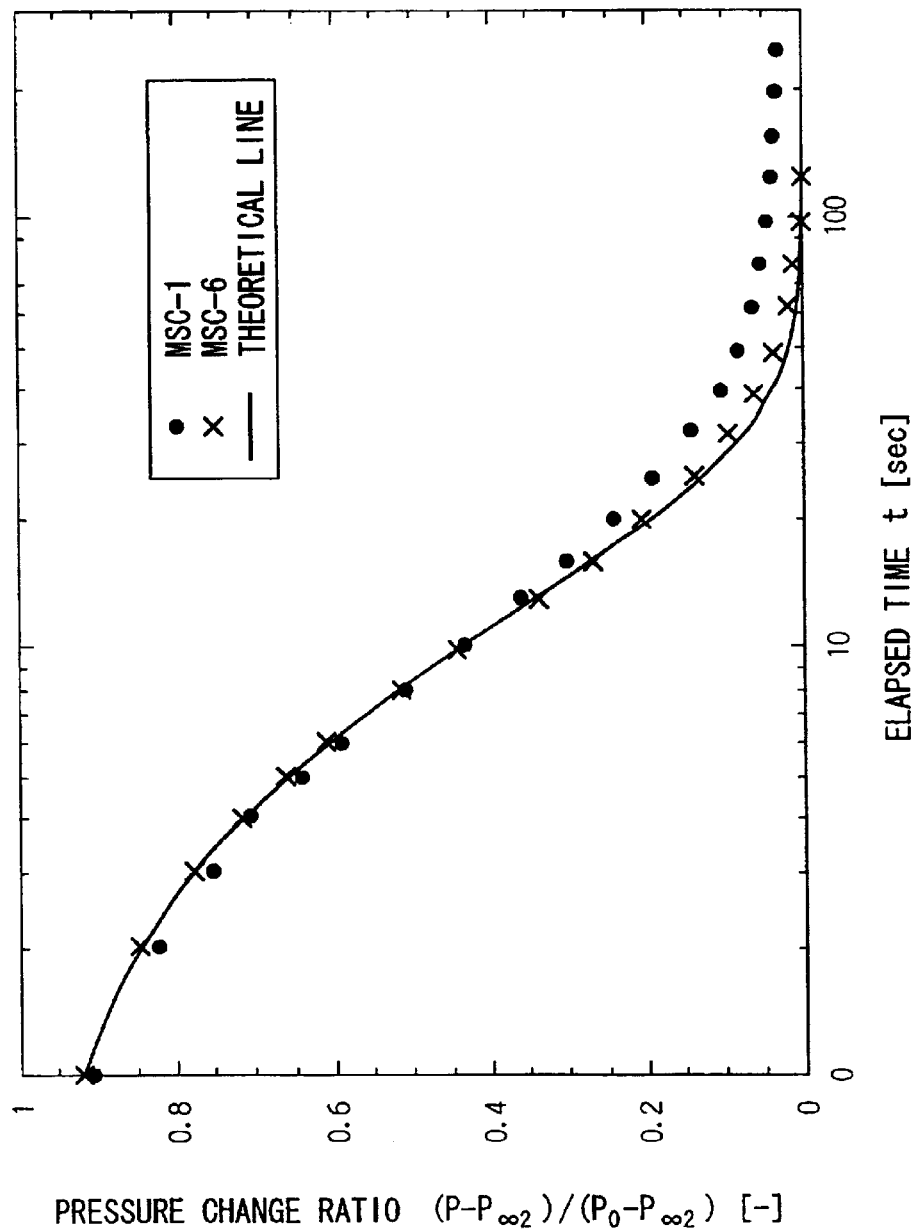
FIG. 6 is a diagram showing a pressure change curve over time during adsorption of each adsorbent MSC-1 and MSC-6.

FIG. 6 shows the pressure change curve over time at the time of oxygen adsorption of currently available MSC-1 (shown by ●) and the pressure change curve over time at the time of oxygen absorption of MSC-6 prepared by the present invention (shown by X) together with the theoretical line.

As is clear from FIG. 6, even in a state in which 95% or more of the oxygen equilibrium adsorption amount was adsorbed, the adsorbent MSC-6 which was produced by the present invention and which achieved a high PSA performance as described above had little deviation from the theoretical line and the adsorption rate did not change. In contrast, it was confirmed that when a state was reached in which about 75% of the oxygen equilibrium adsorption amount was adsorbed, the MSC-1 adsorbent which had a low PSA performance began to deviate from the theoretical line, and in a state in which 95% of the equilibrium adsorption amount was adsorbed, the adsorption rate clearly decreased.

Figure 7:
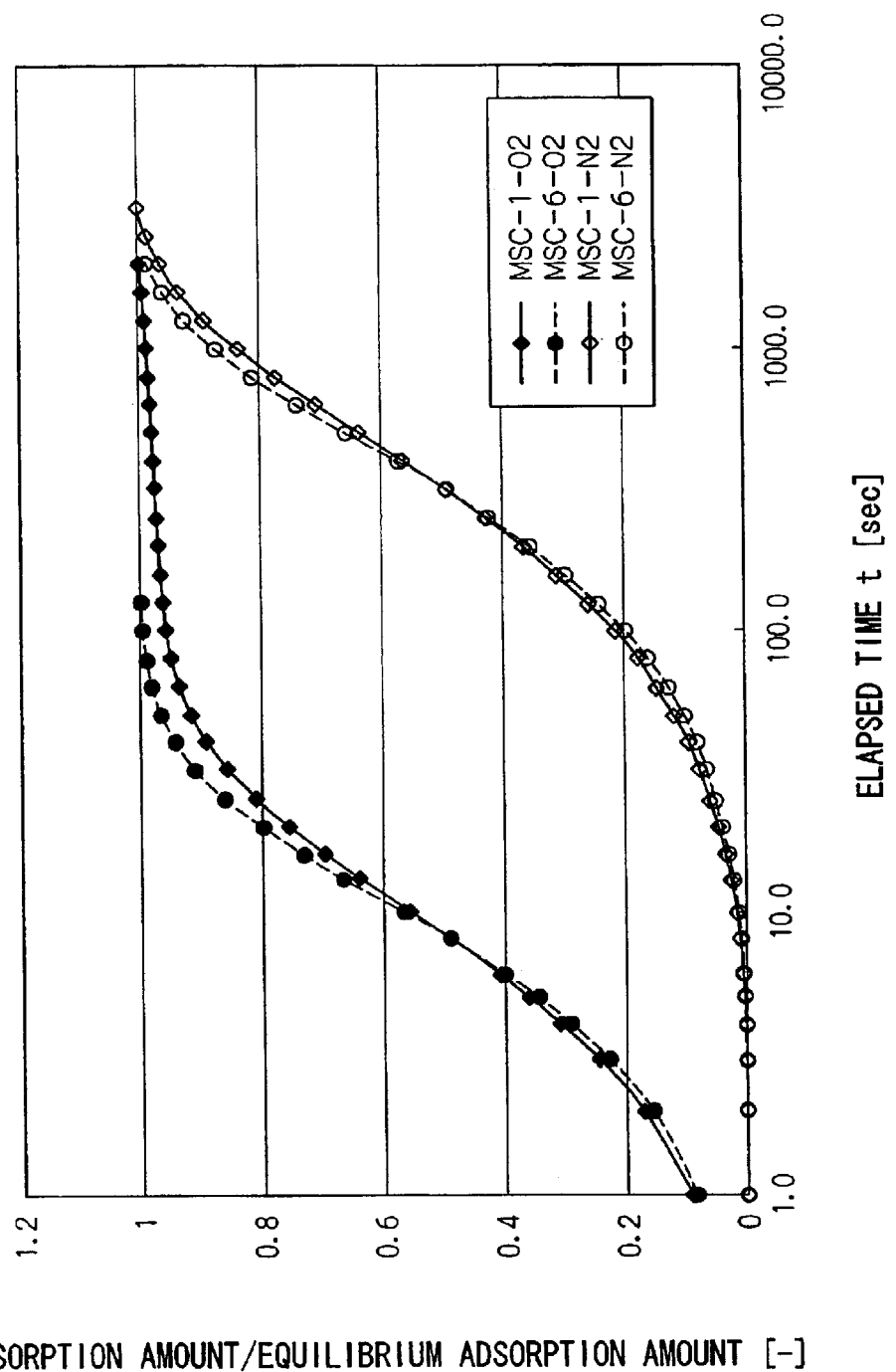
FIG. 7 is a diagram showing an adsorption amount change curve determined from a pressure change over time during each of oxygen adsorption and nitrogen adsorption of MSC-1 and MSC-6.

Similarly, FIG. 7 shows the adsorption amount change curve determined from the pressure change over time during oxygen adsorption and nitrogen adsorption for each of MSC-1 and MSC-6. Regarding the MSC-1 adsorbent which had a low PSA performance, the difference for nitrogen is not as clear as that for oxygen. However, it is clear that when approaching the equilibrium adsorption amount, the adsorption rate decreases. Furthermore, it is clear from this figure that the adsorption rates of the MSC-1 adsorbent and the MSC-6 adsorbent up to about half of the equilibrium adsorption amount are about the same in terms of oxygen and also in terms of nitrogen. It can be said that there is an even larger difference in the adsorption rate of oxygen when the adsorption amount approaches the equilibrium adsorption amount.

From the above information, in the present invention, introduction of the ratio ($t_{95}/t_{50}$) between the time $t_{50}$ required for adsorbing 50% of the oxygen equilibrium adsorption amount and the time $t_{95}$ required for adsorbing 95% of the oxygen equilibrium adsorption amount was taken as an index which shows the delay from the theoretical line. Upon examining the value of the ratio ($t_{95}/t_{50}$) between the time $t_{50}$ required for adsorbing 50% of the oxygen equilibrium adsorption amount and the time $t_{95}$ required for adsorbing 95% of the oxygen equilibrium adsorption amount, the conventional MSC-1, 2, 3, and 4 of FIG. 5 which were inferior in PSA performance had values of 8.6 to 8.8. In contrast, MSC-5, 6, 7, 8, and 10 of the present invention which were superior in PSA performance had values of 5.0 to 6.9. It can be confirmed that these values are lower than the values for the conventional MSC-1, 2, 3, and 4.

Therefore, the influence of the oxygen and nitrogen separation ratio $\alpha$ and the ratio ($t_{95}/t_{50}$) exerted on the PSA performance was further examined on the basis of the measurement results of Table 1.

Figure 8:
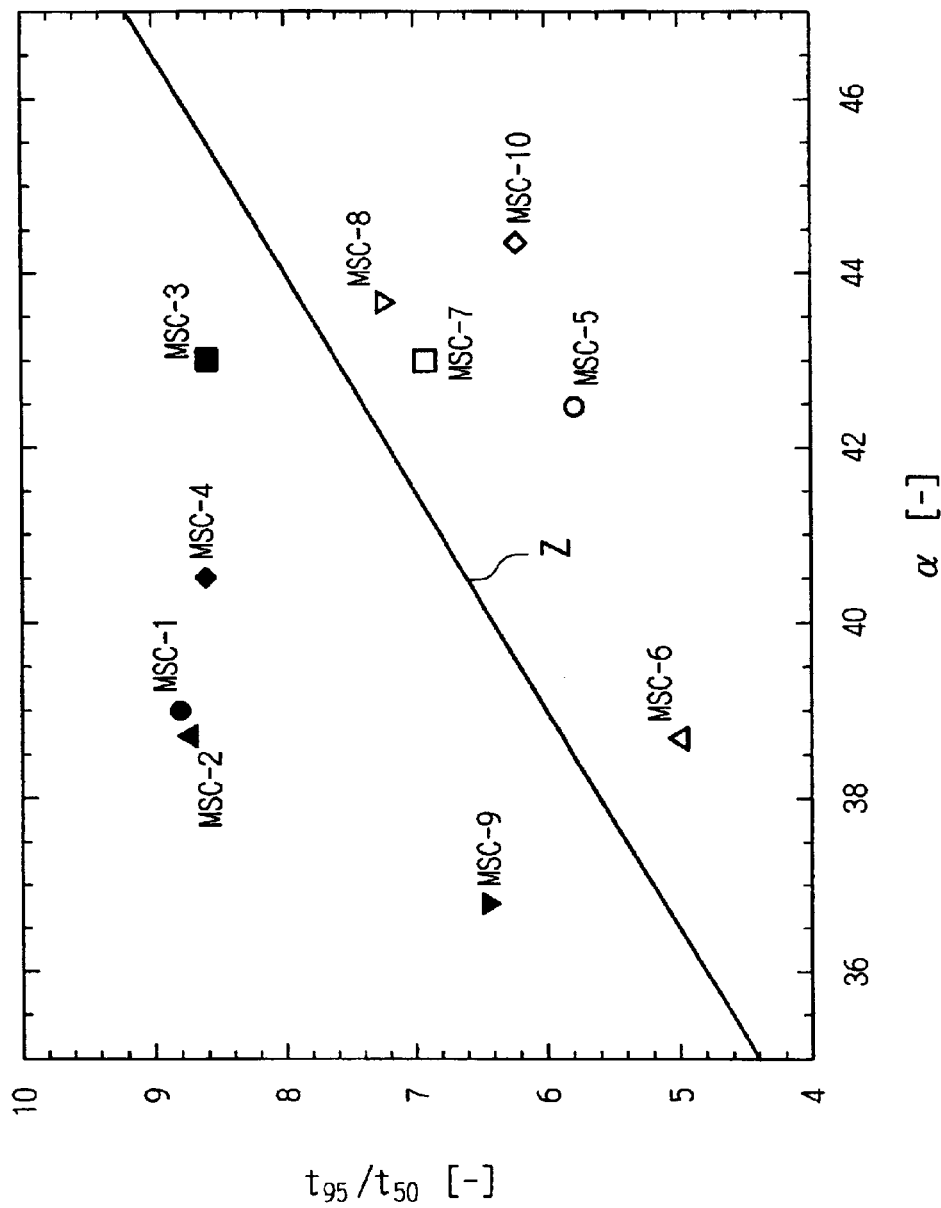
FIG. 8 is a diagram showing a graph of the relationship between the separation ratio α and the ($t_{95}/t_{50}$) ratio for each MSC adsorbent specimen.

As a result, as shown in FIG. 8, a graph was obtained showing the relationship between the separation ratio $\alpha$ and the ($t_{95}/t_{50}$) ratio for each of MSC-1, 2, 3, 4, 5, 6, 7, 8, 9, and 10 described above. In FIG. 8, similar to FIG. 5, MSCs which exhibited and were evaluated as having a good PSA performance are shown by open symbols, and MSCs evaluated as having a low PSA performance are shown by solid symbols. Between these points, an imaginary indicator line Z for judging the superiority/inferiority in performance was drawn.

As is clear from FIG. 8, it is possible to evaluate that, for the case of an oxygen and nitrogen separation ratio α of 39 and a value of ($t_{95}/t_{50}$) of 6 or less, a MSC adsorbent having a desired PSA performance could be obtained, and when the separation ratio α was 44 and the value of ($t_{95}/t_{50}$) was 8 or less, a MSC adsorbent having a des red PSA performance could be obtained.

In other words, the oxygen and nitrogen separation ratio α and ($t_{95}/t_{50}$) are complementary. A preferable PSA performance is one i which the larger the separation ratio α is, the smaller ($t_{95}/t_{50}$) is. However, if the separation ratio α becomes large, a relatively large value of ($t_{95}/t_{50}$) will be allowable. According to the above, it was found necessary that the MSC adsorbent which has a superior PSA performance and which can efficiently and effectively separate and collect nitrogen by means of the PSA type nitrogen production method of the present invention satisfies the following conditions, expressed by a formula representing the imaginary indicator line Z of FIG. 8.

$$(t_{95}/t_{50}) < 0.4 \times (\alpha - 24) \alpha \geq 35;$$

INDUSTRIAL APPLICABILITY

As explained above, the adsorbent for separating nitrogen from a mixed gas of oxygen and nitrogen of the present invention is MSC wherein the oxygen and nitrogen separation ratio α and the ratio ($t_{95}/t_{50}$) of time $t_{50}$ for adsorbing 50% of the oxygen equilibrium adsorption amount and time $t_{95}$ for adsorbing 95% of the oxygen equilibrium adsorption amount satisfy the formula $$(t_{95}/t_{50}) < 0.4 \times (\alpha - 24) \alpha \geq 35;$$

Since a method is provided for producing nitrogen by separating nitrogen from a mixed gas of oxygen and nitrogen by means of a PSA method, it is possible to remarkably increase the PSA performance in the production of nitrogen gas and to provide a nitrogen production method which improves the recovery ratio and which is economically very superior.

Specifically, it is possible to reduce the amount of adsorbent used with respect to a predetermined nitrogen generation amount. By this means, it is possible to reduce the cost of the apparatus and reduce and miniaturize the scale of the apparatus, and effects such as reducing power consumption are exhibited.

What is claimed is:

1. An adsorbent for separating nitrogen from a mixed gas of oxygen and nitrogen, the adsorbent being a MSC, wherein a oxygen and nitrogen separation ratio α (ratio of an oxygen adsorption rate constant $K(O_2)$ and nitrogen adsorption rate constant $K(N_2)$, $K(O_2)/K(N_2)$) is 35 or more, and an adsorption rate characteristic, expressed by a time $t_{95}$ required for adsorbing 95% of an oxygen equilibrium adsorption amount and a time $t_{50}$ required for adsorbing 50% of an oxygen equilibrium adsorption amount, satisfies the following inequality:

$$(t_{95}/t_{50}) < 0.4 \times (\alpha - 24) \alpha \geq 35.$$

2. An adsorbent for separating nitrogen from a mixed gas of oxygen and nitrogen according to claim 1, wherein the MSC is prepared by a pore adjustment process by means of chemical vapor deposition (CVD) of a thermally decomposable hydrocarbon at 600 to 770° C.

3. An adsorbent for separating nitrogen according to claim 1, wherein the mixed gas of oxygen and nitrogen is air.

4. A nitrogen production method carried out by a PSA method in which one cycle comprises a pressurization adsorption step of collecting nitrogen by pressurizing a mixed gas of oxygen and nitrogen and bringing it into contact with the adsorbent according to claim 1, and a depressurization desorption step of depressurizing the adsorbent which is in a pressurized state after the adsorption step and desorbing the adsorbed component, wherein a half cycle time is within a range of 45 to 240 seconds.

5. The nitrogen production method according to claim 4, wherein the half cycle time is within a range of 60 to 180 seconds.

6. An adsorbent for separating nitrogen from a mixed gas of oxygen and nitrogen, the adsorbent being a MSC, wherein an oxygen adsorption rate constant is $6.5 \times 10^{-2}$ s$^{-1}$ or more, an oxygen and nitrogen separation ratio α (ratio of an oxygen adsorption rate constant $K(O_2)$ and a nitrogen adsorption rate constant $K(_2)$, $K(O_2)/K(N_2)$) is 35 or more, and an adsorption rate characteristic, expressed by a time $t_{95}$ required for adsorbing 95% of an oxygen equilibrium adsorption amount and a time $t_{50}$ required or adsorbing 50% of an oxygen equilibrium adsorption amount, satisfies the following inequality:

$$(t_{95}/t_{50}) < 0.4 \times (\alpha - 24) \alpha \geq 35.$$

\* \* \* \* \*